United States Patent
Tsuji et al.

(10) Patent No.: US 6,725,027 B1
(45) Date of Patent: Apr. 20, 2004

(54) MULTIPATH NOISE REDUCER, AUDIO OUTPUT CIRCUIT, AND FM RECEIVER

(75) Inventors: Masayuki Tsuji, Tokyo (JP); Eiji Asano, Tokyo (JP); Masahiro Tsujishita, Tokyo (JP); Kenichi Taura, Tokyo (JP); Masayuki Ishida, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 509 days.

(21) Appl. No.: 09/624,009

(22) Filed: Jul. 21, 2000

(30) Foreign Application Priority Data

Jul. 22, 1999 (JP) ............................................ 11-207422

(51) Int. Cl.⁷ ............................. H04B 1/10; H04B 17/00
(52) U.S. Cl. ......................... 455/296; 455/65; 455/297; 455/299; 455/226.1
(58) Field of Search .......................... 455/65, 296, 501, 455/63, 226.1, 312, 305, 307, 308, 309, 297, 299, 67.11, 63.1

(56) References Cited

U.S. PATENT DOCUMENTS

| | | | |
|---|---|---|---|
| 3,979,679 A | | 9/1976 | Bush et al. |
| 4,293,736 A | * | 10/1981 | Ogita .............................. 381/4 |
| 4,499,605 A | * | 2/1985 | Garskamp .................... 455/210 |
| 4,878,252 A | * | 10/1989 | Sessink ..................... 455/276.1 |
| 4,879,729 A | | 11/1989 | Salembier et al. |
| 5,222,252 A | * | 6/1993 | Kasser ..................... 455/67.13 |
| 5,390,344 A | | 2/1995 | Nagata |
| 5,603,107 A | * | 2/1997 | Gottfried et al. ............ 455/133 |
| 5,661,490 A | * | 8/1997 | McEwan ...................... 342/387 |
| 5,828,954 A | * | 10/1998 | Wang .......................... 455/260 |
| 6,233,443 B1 | * | 5/2001 | Brommer ..................... 455/296 |
| 6,473,605 B1 | * | 10/2002 | Ecklund et al. .............. 455/296 |
| 2002/0012391 A1 | * | 1/2002 | Ahn ............................ 375/232 |
| 2003/0022650 A1 | * | 1/2003 | Tsuji et al. .................. 455/296 |

FOREIGN PATENT DOCUMENTS

| | | |
|---|---|---|
| EP | 0 274 157 A1 | 7/1988 |
| JP | 2283129 | 11/1990 |

OTHER PUBLICATIONS

A Modified Adaptive FIR Equalizer for Multipath Echo Cancellation in FM Transmission Kammeyer, K.; Mann, R.; Tobergte, W.; IEEE Journal on , vol.: 5 Issue: 2 , Feb. 1987 pp.: 226–237.*

* cited by examiner

Primary Examiner—Nay Maung
Assistant Examiner—Edan Orgad
(74) Attorney, Agent, or Firm—Birch, Stewart, Kolasch & Birch, LLP

(57) ABSTRACT

A multipath noise reducer detects and removes the individual noise spikes occurring in an interval of multipath noise, thereby reducing the multipath noise with minimal distortion of the audio output signal. The multipath noise spikes are detected by comparing a rectified signal with a threshold signal derived from the rectified signal. When the multipath noise reducer is used in an FM stereo radio receiver, stereo separation may also be controlled according to the detection of multipath noise.

13 Claims, 16 Drawing Sheets

FIG. 14
(a)
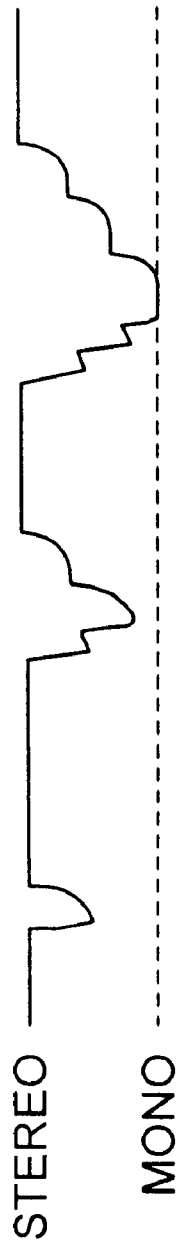
(b)
STEREO
MONO

MULTIPATH NOISE REDUCER, AUDIO OUTPUT CIRCUIT, AND FM RECEIVER

BACKGROUND OF THE INVENTION

This invention relates to a multipath noise reducer, an audio output circuit including a multipath noise reducer, and a frequency-modulation (FM) radio receiver including a multipath noise reducer.

Radio receivers are afflicted by various types of electromagnetic noise. Radio broadcast receivers mounted in automobiles, for example, must contend with ignition noise and mirror noise, which are impulsive in character and are generally referred to as impulse noise. These so-called car radios also experience episodes of multipath noise due to reflection of radio waves from hills, high buildings, and other passing objects. Multipath noise occurs because the car radio antenna receives both a line-of-sight signal, coming directly from the transmitting antenna, and reflected signals, reflected from the passing objects. The reflected signals tend to be out of phase with the line-of-sight signal, causing the line-of-sight signal to be partly attenuated by the reflected signals. The resulting deterioration in quality of the audio output from a car radio is a familiar experience to automobile riders.

Various methods of reducing noise are known. In an FM stereo car radio, one method is to detect the strength of the electric field received at the antenna, and take noise countermeasures when the field is weak. One countermeasure is to reduce the degree of stereo separation, or to switch completely from stereo to monaural operation. This countermeasure will be referred to below as stereo separation control. Another countermeasure is to attenuate or "cut" high-frequency components in the demodulated signal. This countermeasure will be referred to below as high-cut control. Both of these countermeasures improve the signal-to-noise (S/N) ratio during intervals when the electric field received at the antenna is weak.

To reduce impulse noise, car radios may also include an impulse noise reducer that detects the onset of impulse noise and generates a gate signal having a predetermined length sufficient to cover the expected duration of the impulse noise, which is typically only a fraction of a millisecond. When the gate signal is active, the signal output by the car radio is held constant, effectively suppressing the noise.

The gate pulse used in this type of impulse noise reducer is too short to mask multipath noise, the duration of which is typically much longer than the duration of impulse noise. The gate pulse could be lengthened to cover multipath noise intervals, but a long gate pulse would noticeably distort the audio output signal. Furthermore, the long gate pulse would be triggered by each short occurrence of impulse noise, resulting in much needless audio distortion during times when no noise was present.

Further details of these problems will be given in the detailed description of the invention.

SUMMARY OF THE INVENTION

An object of this invention is to reduce multipath noise with minimal output distortion.

The invented multipath noise reducer includes rectifying means, threshold-calculating means, comparator means, and modification means. The rectifying means generates a rectified signal corresponding to an absolute value of an input signal. The threshold-calculating means generates a threshold signal having a value related to the rectified signal. The comparator means detects multipath noise by comparing the rectified signal with the threshold signal, and outputs a detection signal. The modification means modifies the input signal according to the detection signal, thereby reducing multipath noise present in the input signal.

The active pulses in the detection signal do not have a predetermined width, but correspond to the actual width of multipath noise spikes occurring in the input signal. All multipath noise spikes can thereby be removed without distortion of other parts of the signal.

The rectifying means includes, for example, a high-pass filter and an absolute-value calculation means. The high-pass filter facilitates both the accurate detection of multipath noise by the comparator means, and the generation of an appropriate threshold signal by the threshold-calculating means.

The rectifying means may be configured so that the high-pass filter operates on the output of the absolute-value calculation means. This configuration enables the width of multipath noise spikes to be detected accurately with a comparatively simple high-pass filter.

The threshold-calculating means includes, for example, smoothing means for smoothing the rectified signal. The smoothing means prevents the threshold signal from being affected by signal variations below the noise floor level.

The threshold-calculating means may also include limiting means for limiting variations in the input and/or output of the smoothing means. Excessive variations in the threshold signal are thereby prevented.

The invented audio output circuit includes a multipath noise reducer as described above. The invented audio output circuit can accordingly generate an audio output signal that remains comparatively free of distortion even during intervals of multipath noise.

If the audio signal generated by the audio output circuit is a stereo signal, the audio output circuit may also include control means receiving the detection signal from the comparator means in the multipath noise reducer and generating therefrom a control signal controlling stereo separation of the audio signal. Distortion due to multipath noise can then be further reduced.

The control means comprises, for example, time-constant means for combining past and present values of the detection signal according to a predetermined time constant. Unwanted effects such as an unstable sound image and rapid volume fluctuations can then be avoided.

The control means may cause the control signal to vary in a stepwise manner, which also prevents rapid volume fluctuations.

The control means may cause control of the stereo separation of the audio signal to start at a zero-crossing point of the audio signal. Discontinuities in the output audio signal are thereby avoided.

The invention also provides an FM radio receiver including an audio output circuit as described above. FM broadcasts can then be received with reduced distortion due to multipath noise.

Alternatively, the invention provides an FM stereo radio receiver including an FM demodulator, a multipath noise reducer, and an impulse noise reducer. The multipath noise reducer reduces multipath noise in the demodulated signal output by the FM demodulator. The impulse noise reducer reduces impulse noise in the signal output from the multipath noise reducer. FM stereo broadcasts can then be received with reduced distortion due to both multipath noise and impulse noise.

The multipath noise reducer in this FM stereo radio receiver may of course be the invented multipath noise reducer, in which case the above-described effects of the invented multipath noise reducer are obtained.

BRIEF DESCRIPTION OF THE DRAWINGS

In the attached drawings:

FIG. 14 is a waveform diagram illustrating the operation of a variation of the control unit in FIG. 12;

DETAILED DESCRIPTION OF THE INVENTION

Figure 1:
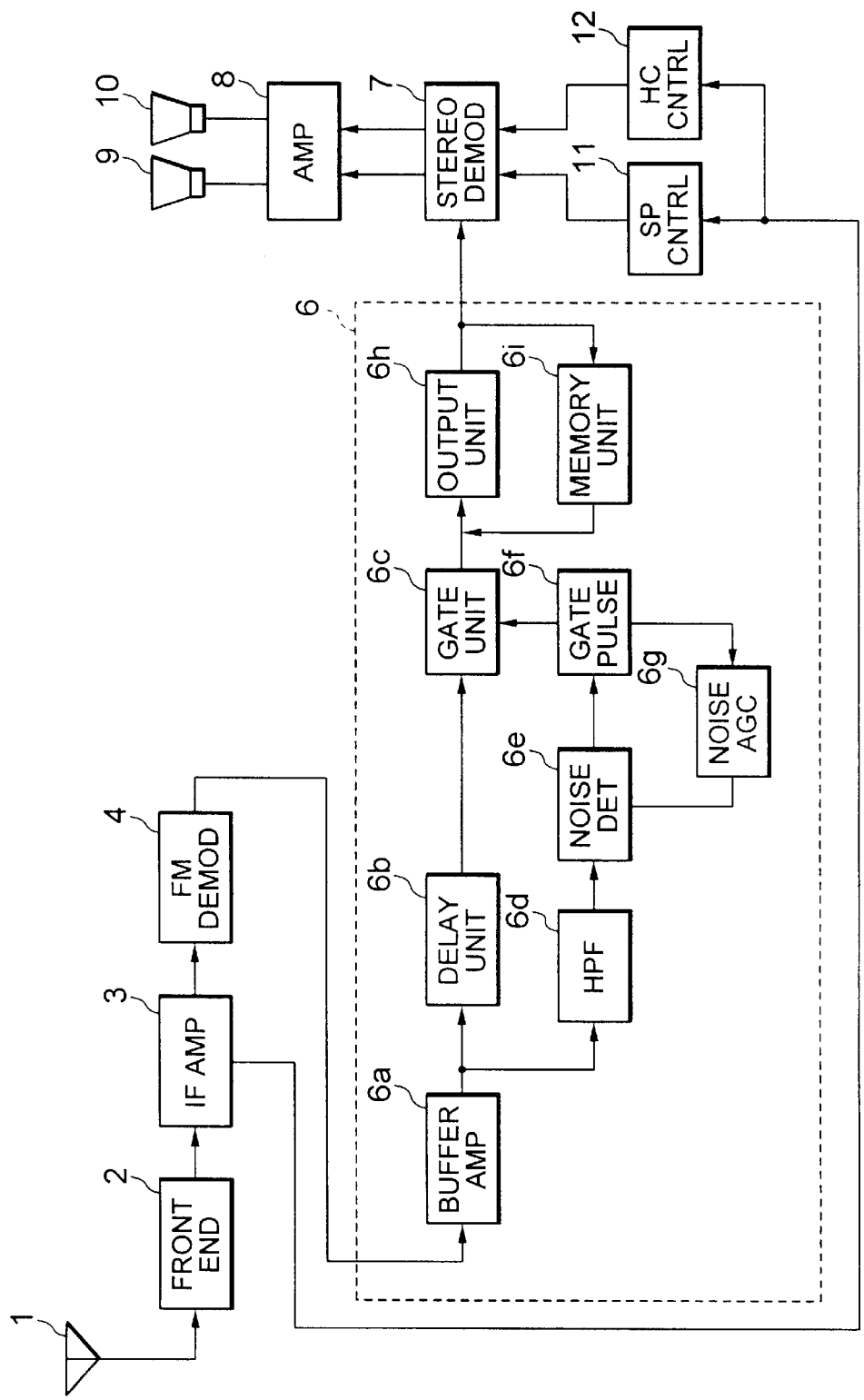
FIG. 1 is a block diagram of a conventional FM stereo radio receiver.

Embodiments of the invention will be described with reference to the attached drawings, following a description of a conventional FM stereo radio receiver with an impulse noise reducer. This description is relevant because the impulse noise reducer is also used in the embodiments of the invention. Like elements in different drawings will be indicated by like reference characters.

Referring to FIG. 1, the conventional FM stereo radio receiver comprises an antenna 1, a radio-frequency (RF) signal-processing circuit or 'front end' 2, an intermediate-frequency amplifier (IF AMP) 3, an FM demodulator (DEMOD) 4, an impulse noise reducer 6, a stereo demodulator 7, a low-frequency amplifier (AMP) 8, a pair of loudspeakers 9, 10, a stereo separation controller (SP CNTRL) 11, and a high-cut controller (HC CNTRL) 12.

The RF front end 2 amplifies the radio-frequency signal received from the antenna 1 and down-converts the amplified RF signal to the intermediate frequency. The IF amplifier 3 amplifies the resulting IF signal, and outputs both the amplified IF signal and a signal-meter signal or S-meter signal. The S-meter signal indicates the field strength received at the antenna. The FM demodulator 4 demodulates the amplified IF signal to generate an FM composite signal.

The impulse noise reducer 6 reduces impulse noise in the FM composite signal. The stereo demodulator 7 separates the FM composite signal into a left-channel signal and a right-channel signal. The low-frequency amplifier 8 amplifies these two signals for output to the loudspeakers 9, 10. The stereo separation controller 11 performs stereo separation control on the basis of the S-meter signal. The high-cut controller 12 performs high-cut control, also on the basis of the S-meter signal.

The impulse noise reducer 6 comprises a buffer amplifier 6a, a delay unit 6b, a gate unit 6c, a high-pass filter (HPF) 6d that extracts high-frequency impulse noise from the output of the FM demodulator 4, a noise detector (DET) 6e, a gate pulse generator 6f that generates a gate pulse of a predetermined duration or width on the time axis when noise is detected, an automatic gain control (AGC) circuit 6g for the noise level, an output unit 6h, and a memory unit 6i that stores the immediately preceding output signal. When noise is not detected, the gate unit 6c remains closed, and the FM composite signal output from the FM demodulator 4 propagates through the buffer amplifier 6a, delay unit 6b, gate unit 6c, and output unit 6h to the stereo demodulator 7 and memory unit 6i. When noise is detected in the FM composite signal by the noise detector 6e, a gate pulse of the predetermined width is output from the gate pulse generator 6f, opening the gate unit 6c. While the gate unit 6c remains open, the output signal from the delay unit 6b is blocked, and the signal stored in the memory unit 6i just before noise was detected is output instead, so that the noise does not reach the stereo demodulator 7.

The impulse noise reducer 6 is designed primarily to reduce impulse noise, but when the FM composite signal includes multipath noise, the multipath noise is also detected, and is reduced to some extent.

Figure 2:
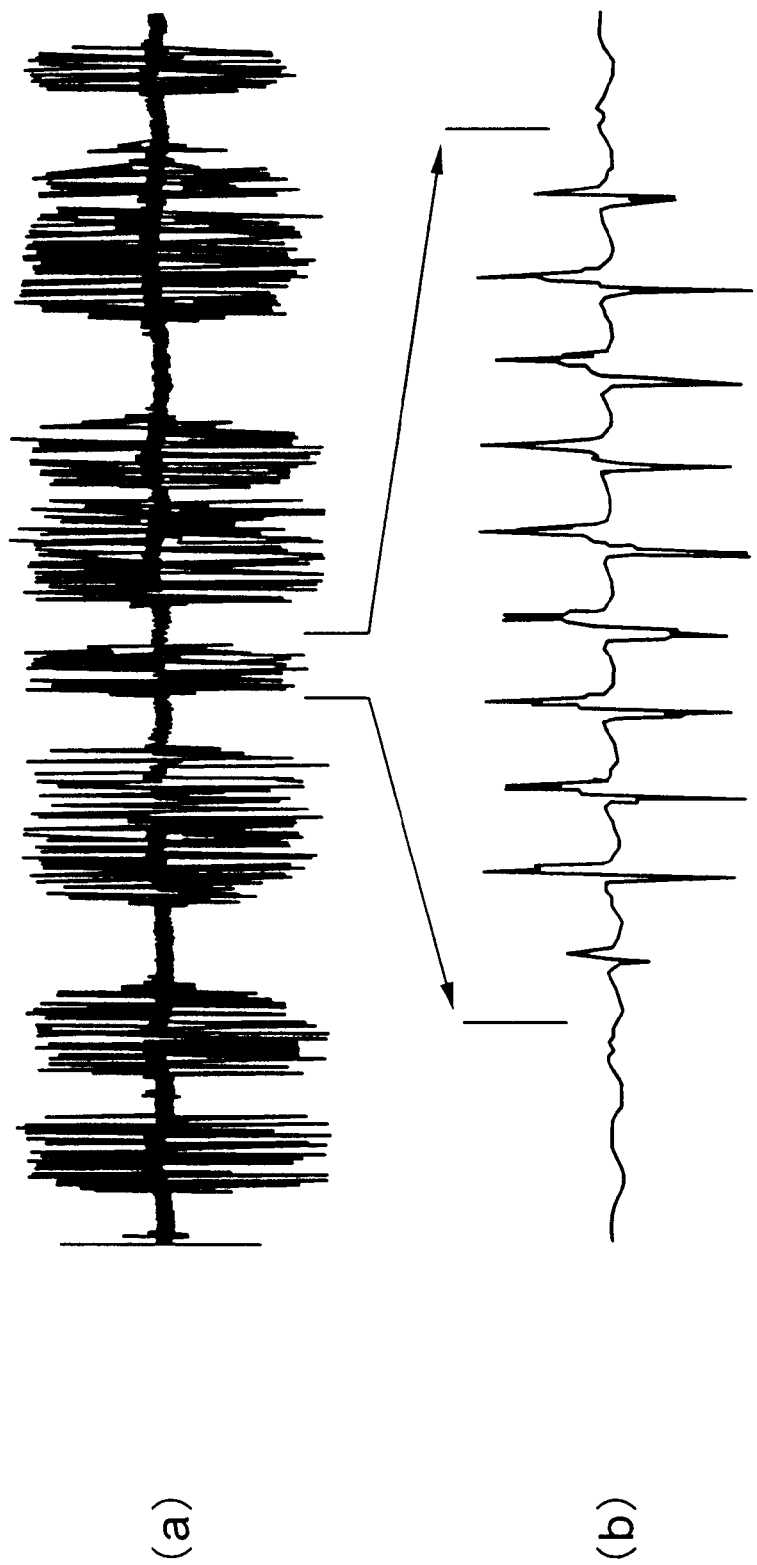
FIG. 2 illustrates a typical multipath noise waveform.

The first waveform (a) in FIG. 2 shows a typical episode of multipath noise in an FM composite signal. The second waveform (b) shows an enlargement of one multipath noise interval. Multipath noise comprises a series of spikes (spike noise), occurring at intervals equal to the FM composite subcarrier period. The enlarged interval, for example, includes ten such spikes, each having a positive component and a negative component.

The gate pulse generated by the gate unit 6c, if set to reduce ignition noise, for example, has a width equivalent to only the first few spikes in the second waveform (b) in FIG. 2. Consequently, the impulse noise reducer 6 is inadequate to the task of rejecting multipath noise. Moreover, in the part of the multipath noise interval that is rejected by the impulse noise reducer 6, both the noise spikes and the signal segments between the spikes are rejected. The segments between the noise spikes include valid information, which the impulse noise reducer 6 needlessly removes from the FM composite signal.

If the gate pulse width in the impulse noise reducer 6 were to be increased to cover the longest intervals of multipath noise, then much valid information would be lost, and the audio output signal might be very noticeably distorted. In the worst case, the audio output signal might completely disappear for a noticeable length of time.

Figure 3:
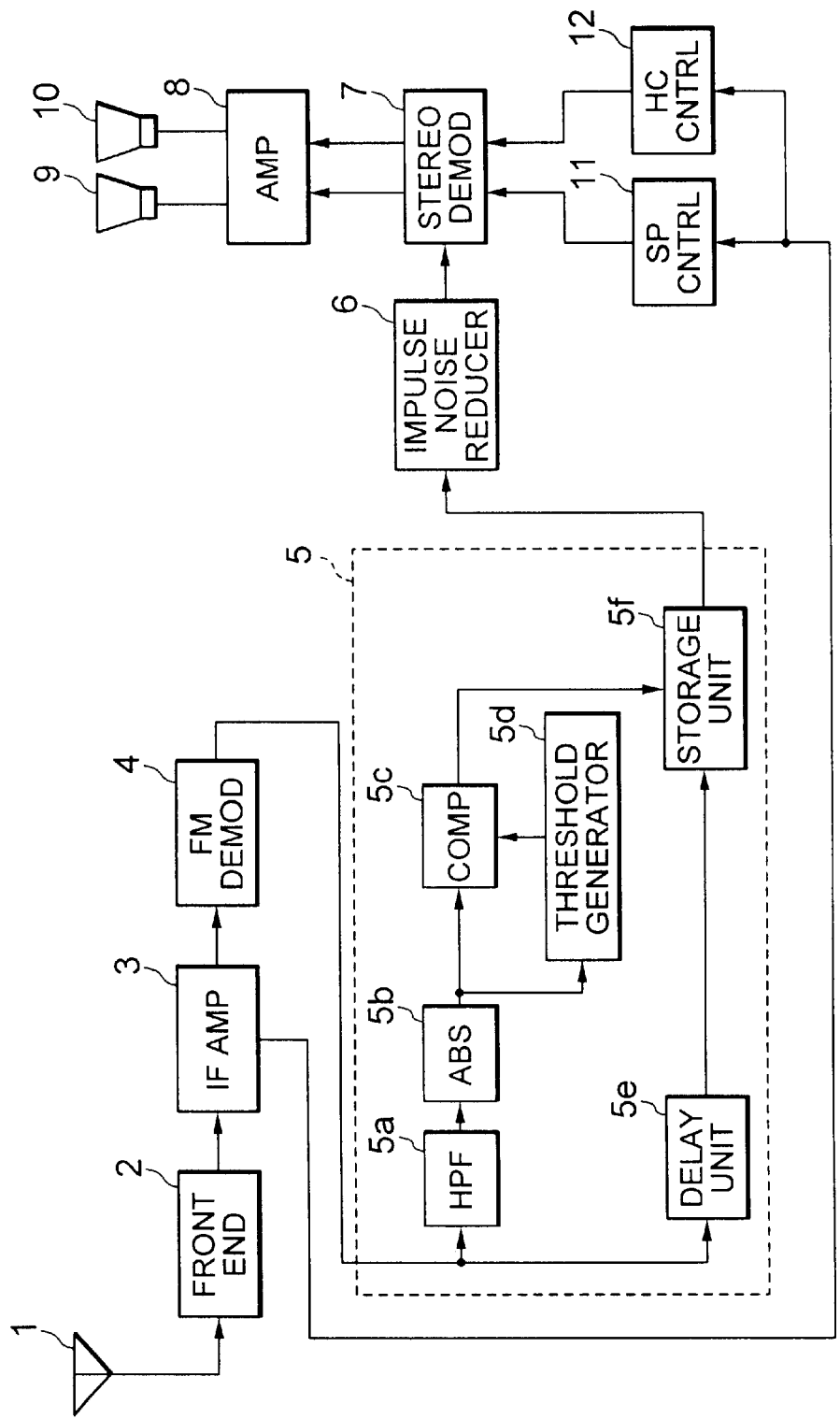
FIG. 3 is a block diagram of an FM stereo radio receiver illustrating a first embodiment of the invention.

As a first embodiment of the invention, FIG. 3 shows an FM stereo radio receiver comprising an antenna 1, an RF front end 2, an IF amplifier 3, an FM demodulator 4, a multipath noise reducer 5, an impulse noise reducer 6, a stereo demodulator 7, a low-frequency amplifier 8, a pair of loudspeakers 9, 10, a stereo separation controller 11, and a high-cut controller 12. The multipath noise reducer 5 comprises a high-pass filter (HPF) 5a, an absolute-value calculation unit (ABS) 5b, a comparator unit (COMP) 5c, a threshold generator 5d, a delay unit 5e, and a storage unit 5f. The high-pass filter 5a and absolute-value calculation unit 5b form a rectifying means in which the output of the high-pass filter 5a becomes the input of the absolute-value calculation unit 5b. The multipath noise reducer 5, impulse noise reducer 6, stereo demodulator 7, low-frequency amplifier 8, stereo separation controller 11, and high-cut controller 12 form an audio output circuit.

The elements other than the multipath noise reducer 5 are similar to the corresponding elements in the conventional FM receiver in FIG. 1, so detailed descriptions will be omitted. The gate pulse width in the impulse noise reducer 6 is adjusted for the removal of impulse noise such as, for example, automobile ignition noise.

Next, the overall operation of the first embodiment will be described.

An FM broadcast signal is received by the antenna 1 and processed by the RF front end 2, IF amplifier 3, and FM demodulator 4 as described above. The FM composite signal output by the FM demodulator 4 will be referred to below simply as a demodulated signal. The demodulated signal passes through the multipath noise reducer 5, which reduces multipath noise, then through the impulse noise reducer 6, which reduces impulse noise. After these two types of noise reduction, the demodulated signal is supplied to the stereo demodulator 7. The stereo demodulator 7, low-frequency amplifier 8, stereo separation controller 11, and high-cut controller 12 operate as in the conventional FM radio receiver. The amplified left-channel and right-channel audio signals are reproduced through the loudspeakers 9, 10.

Next, the operation of the impulse noise reducer 6 will be described in more detail with reference to the waveforms in FIG. 4.

Figure 4:
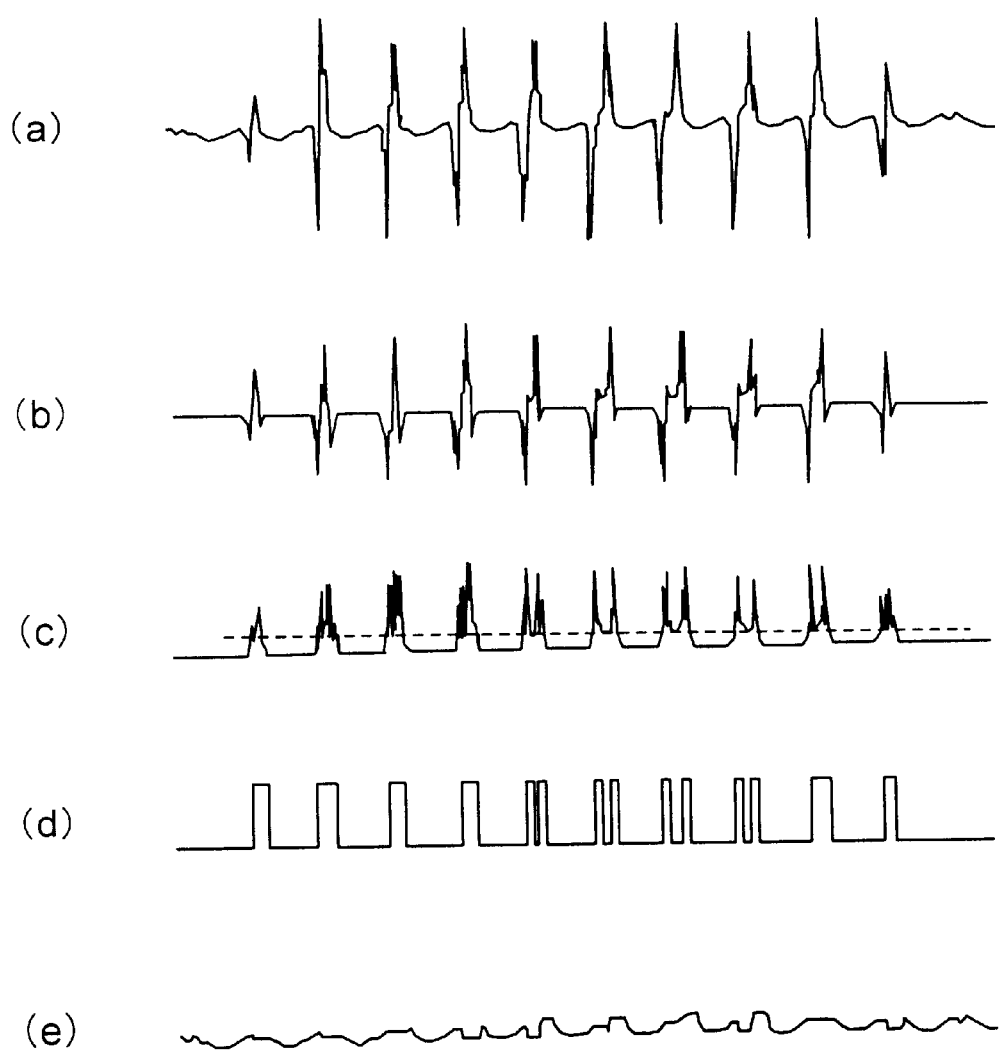
FIG. 4 is a waveform diagram illustrating the operation of the multipath noise reducer in FIG. 3.

The first waveform (a) in FIG. 4 is the enlarged multipath noise waveform that was shown in FIG. 2. The next waveform (b) in FIG. 4 is the corresponding output of the high-pass filter 5a in the multipath noise reducer 5. The cut-off frequency of the high-pass filter 5a is set to detect the noise spikes, while flattening out the slower variations between the noise spikes. The signal output by the high-pass filter 5a accordingly sits substantially at the ground level between noise spikes, and reverses between positive and negative values at the rise and fall of each noise spike. The high-pass filter 5a detects both the rising and the falling edges of the multipath noise spikes in the demodulated signal.

The absolute-value calculation unit 5b rectifies the output of the high-pass filter 5a by replacing negative values with positive values of like magnitude, as shown in the next waveform (c) in FIG. 4. Multipath noise can accordingly be detected by comparing the signal output by the absolute-value calculation unit 5b with a threshold signal, indicated by the dotted line in this waveform (c). The comparison is performed by the comparator unit 5c; the threshold signal is generated by the threshold generator 5d.

By performing this comparison, the comparator unit 5c converts the waveform (c) output by the absolute-value calculation unit 5b to a bi-level signal or pulse signal, as shown in the next waveform (d). This pulse signal (d) functions as a gate pulse signal or detection signal.

The threshold generator 5d generates the threshold signal by smoothing the output of the absolute-value calculation unit 5b over a certain interval of time, using a low-pass filter or similar means. Accordingly, the threshold signal is not constant, but tracks variations in the average level of the absolute value of the filtered signal output by the high-pass filter 5a. The reason for using this type of threshold signal is that under adverse receiving conditions, as the field strength at the receiving antenna 1 deteriorates, so does the signal-to-noise (S/N) ratio of the demodulated signal, raising the base noise level or 'noise floor' and causing the high-pass filter 5a to generate an increasing level of output due to noise other than multipath noise. The threshold value used by the comparator unit 5c must be high enough so that the comparator unit 5c does not detect noise that is part of the general noise floor.

The delay unit 5e delays the demodulated signal for the length of time taken by the high-pass filter 5a, absolute-value calculation unit 5b, comparator unit 5c, and threshold generator 5d to detect multipath noise therein. The resulting delayed demodulated signal is supplied to the storage unit 5f.

The storage unit 5f operates as a transparent latch. When the detection signal (the gate pulse signal) output by the comparator unit 5c is at the low level, indicating that the delayed demodulated signal is free of multipath noise, the storage unit 5f passes the delayed demodulated signal to the impulse noise reducer 6. While the detection signal is at the high level, indicating that multipath noise is present, the output of the storage unit 5f stays unchanged, thus being held at the last value of the delayed demodulated signal that was free of multipath noise. The output of the storage unit 5f is illustrated by the bottom waveform (e) in FIG. 4. During each of the pulses output by the comparator unit 5c in waveform (d), this waveform (e) remains substantially constant.

Each spike in the multipath noise is thereby replaced with the immediately preceding demodulated signal value, so that the noise spikes are removed individually. The impulse noise reducer 6 thus succeeds in removing all of the noise spikes without severely distorting the audio output signal, and without causing the complete disappearance of audio output for a noticeable length of time.

Next, more detailed descriptions of several of the components of the multipath noise reducer 5 will be given.

Figure 5:
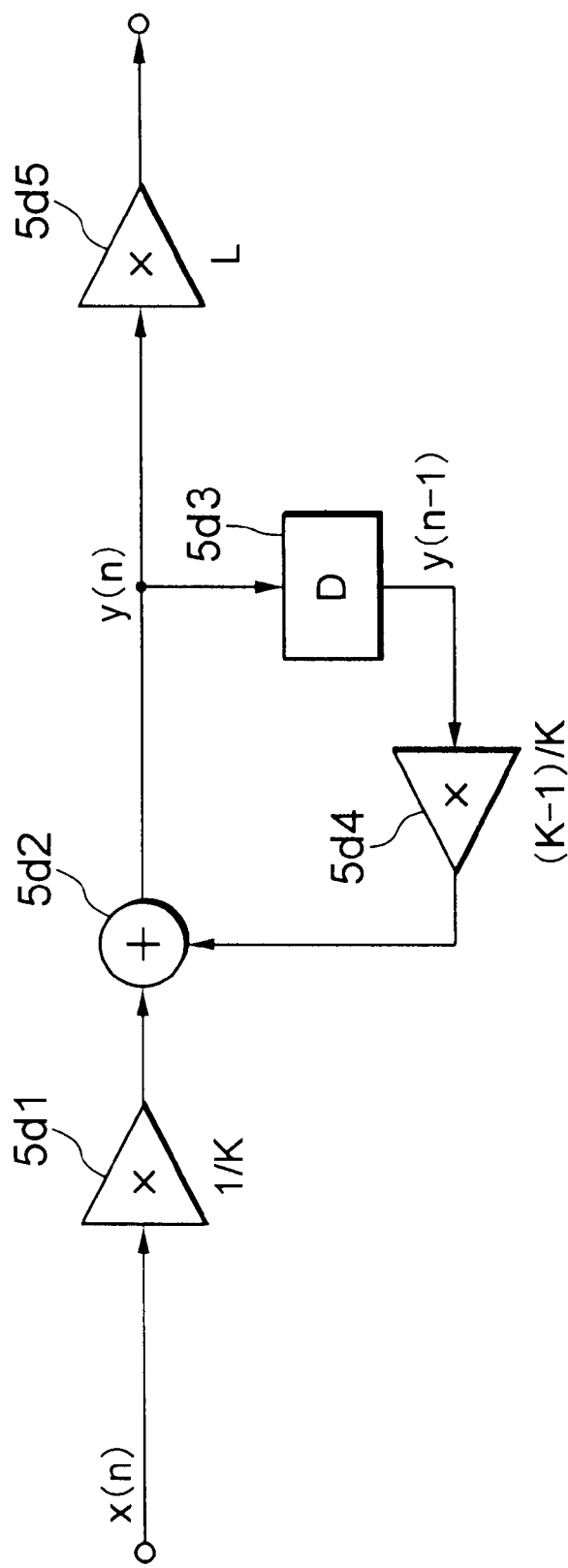
FIG. 5 is a block diagram illustrating one possible structure of the threshold generator in FIG. 3.

FIG. 5 shows a circuit that can be used as the threshold generator 5d. The absolute values received from the absolute-value calculation unit 5b are denoted x(n), n being a discrete time variable; x(n) will also be referred to as the n-th sample received from the absolute-value calculation unit 5b. The letter K is a constant positive time constant. Roughly speaking, the threshold generator 5d smoothes out variations lasting less than K samples in the output of the absolute-value calculation unit 5b. The letter L is a coefficient or gain by which the smoothed value is multiplied to raise the threshold value above the noise floor. L is set to produce a threshold value intermediate between the noise floor level and the noise level when multipath noise is present.

The circuit in FIG. 5 comprises multipliers 5d1, 5d4, 5d5, an adder 5d2, and a one-sample delay unit 5d3. Multiplier 5d1 multiplies the n-th received sample x(n) by 1/K. Adder 5d2 adds the outputs of multipliers 5d1 and 5d4 to obtain a smoothed signal y(n). Multiplier 5d5 multiplies y(n) by L to obtain the threshold signal supplied to the comparator unit 5c. Delay unit 5d3 delays the smoothed signal y(n) by one sample period and supplies the delayed signal y(n−1) to multiplier 5d4. Multiplier 5d4 multiplies the delayed signal y(n−1) by (K—1)/K. The smoothed signal y(n) is accordingly given by the following equation.

$$y(n)=(1/K)\cdot x(n)+\{(K+1)/K\}\cdot y(n-1)$$

The circuit in FIG. 5 may be either a digital or an analog circuit. If analog components are used, the multipliers 5d1, 5d4, 5d5 are amplifiers with the indicated gain values, the adder 5d2 is a summing amplifier, the delay unit 5d3 is an analog delay line, and n is a continuous time variable.

Figure 6:
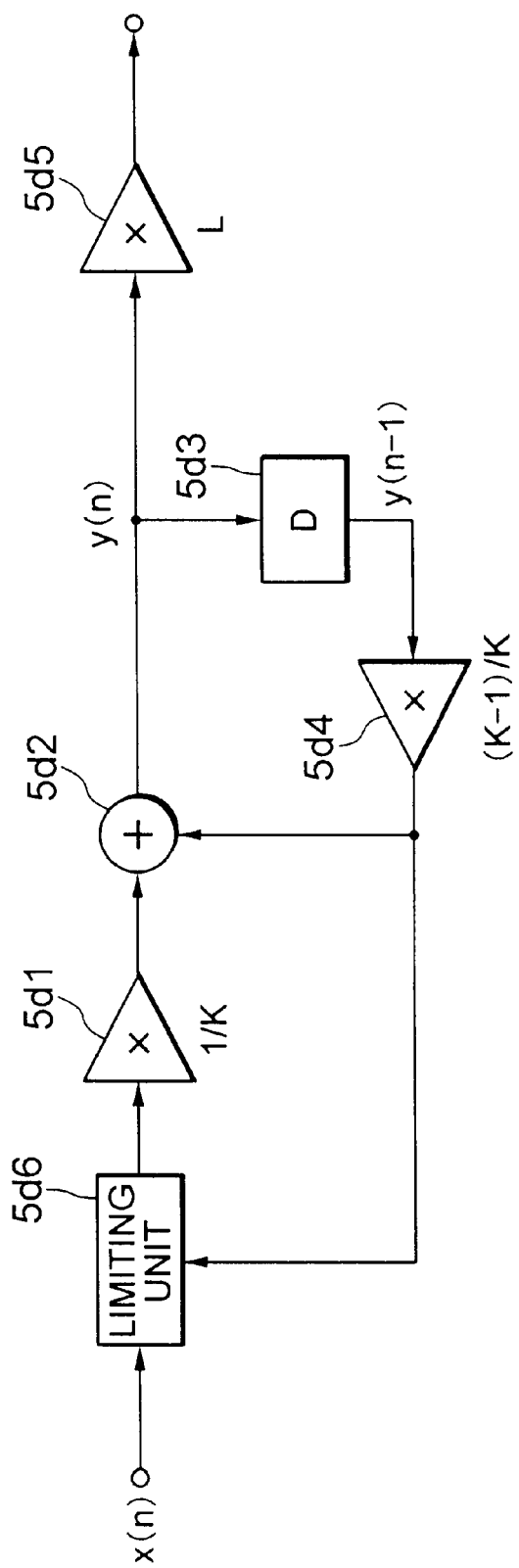
FIG. 6 is a block diagram illustrating another possible structure of the threshold generator in FIG. 3.

FIG. 6 shows another circuit that can be used as the threshold generator 5d. This circuit is identical to the circuit in FIG. 5, with the addition of a limiting unit 5d6 on the input side of the first multiplier 5d1. The limiting unit 5d6 compares the received sample value x(n) with the output of multiplier 5d4; that is, with the delayed smoothed signal y(n−1) multiplied by the quantity (K+1)/K. If x(n) differs greatly from the output of multiplier 5d4, the limiting unit 5d6 limits x(n) so that the signal received by multiplier 5d1 does not differ from the output of multiplier 5d4 by more than a predetermined amount.

The limiting unit 5d6 operates as an amplitude limiting means, limiting the range of variation of the threshold signal output by the threshold generator 5d. Even during intervals of multipath noise, accordingly, the threshold value does not increase too rapidly, enabling an appropriate threshold signal to be obtained without the use of an extremely large value of K. The reduction in the necessary value of K in turn enables the threshold generator 5d to track changes in the noise floor more accurately.

Figure 7:
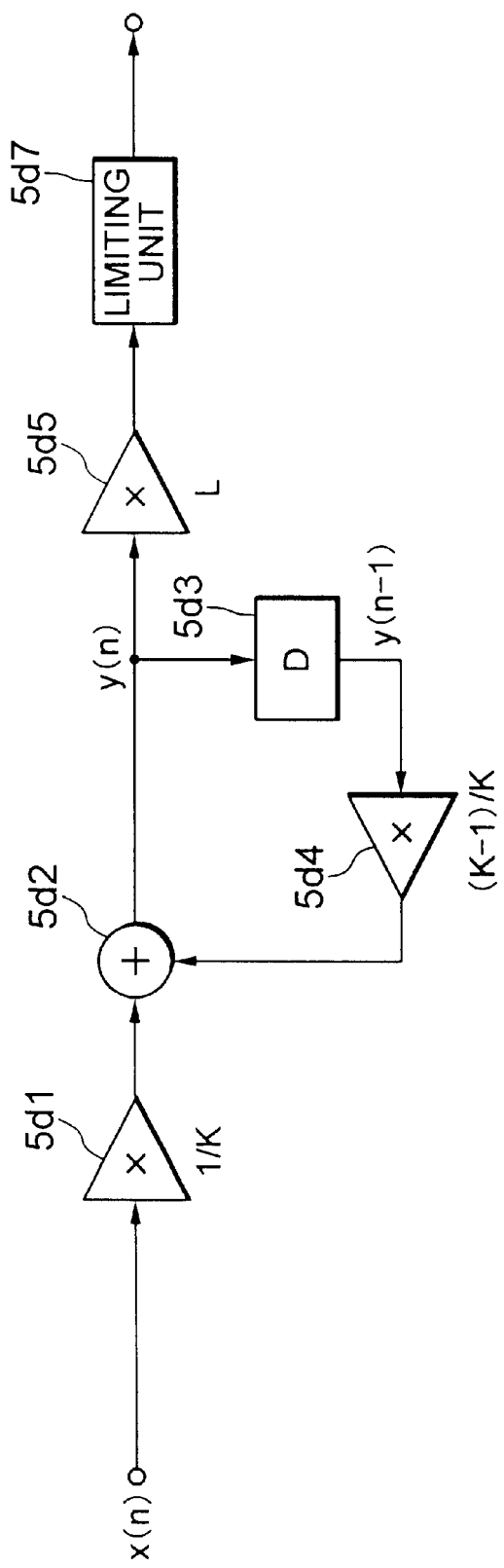
FIG. 7 is a block diagram illustrating another possible structure of the threshold generator in FIG. 3.

FIG. 7 shows still another circuit that can be used as the threshold generator 5d. This circuit is identical to the circuit in FIG. 5, with the addition of a limiting unit 5d7 on the output side of multiplier 5d5. This limiting unit 5d7 also operates as an amplitude limiting means, limiting the threshold value output from the threshold generator 5d to a predetermined range of values, regardless of the behavior of the signal x(n) received from the absolute-value calculation unit 5b. In this way it is possible to prevent the threshold value from becoming either too high or too low, even if the general noise level in the received signal remains abnormally high or abnormally low for an extended period.

Figure 8:
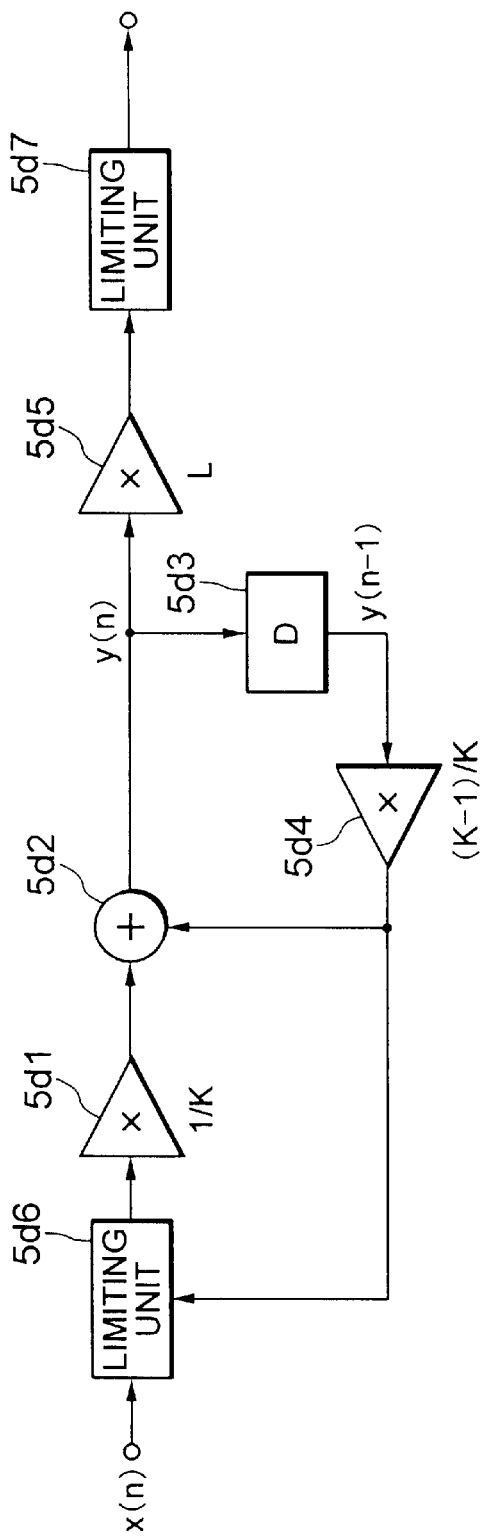
FIG. 8 is a block diagram illustrating another possible structure of the threshold generator in FIG. 3.

FIG. 8 shows yet another circuit that can be used as the threshold generator 5d. This circuit adds both of the limiting units 5d6, 5d7 shown in FIGS. 6 and 7 to the circuit shown in FIG. 5, enabling a relatively small value of K to be used, but still keeping the threshold value reliably within fixed limits.

In addition to these (and other) possible variations in the internal structure of the threshold generator 5d, variations are possible in the operation of the storage unit 5f. For example, instead of functioning as a transparent latch and replacing each multipath noise spike with the constant value immediately preceding the spike, the storage unit 5f can replace the spike with a linearly varying value obtained by interpolation between the values immediately preceding and immediately following the spike.

In another variation of the first embodiment, the relationships of the multipath noise reducer 5 and the impulse noise reducer 6 are reversed, so that the impulse noise reducer 6 receives the output of the FM demodulator 4, the multipath noise reducer 5 receives the output of the impulse noise reducer 6, and the stereo demodulator 7 receives the output of the multipath noise reducer 5. This variation also applies to the embodiments to be described below.

Figure 9:
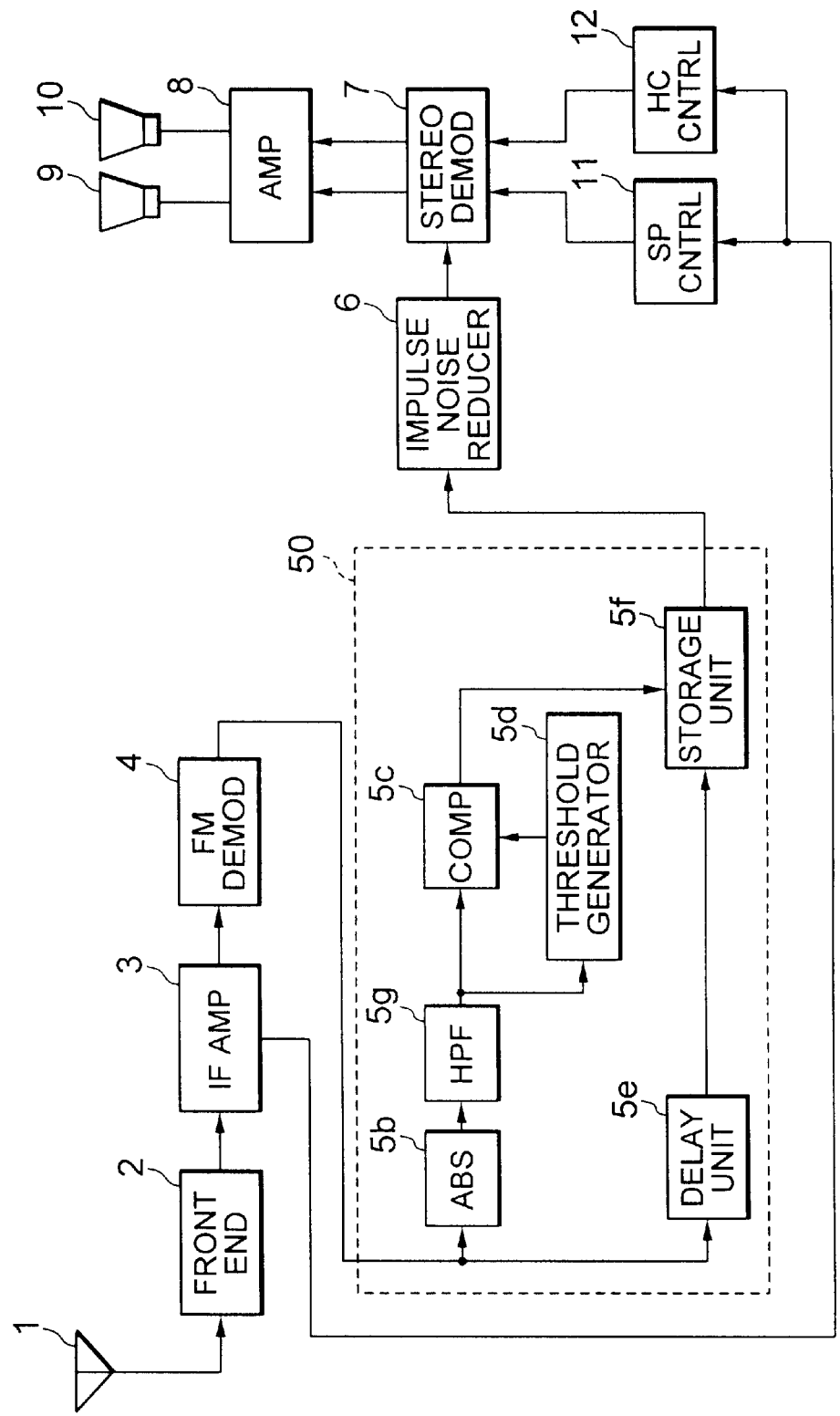
FIG. 9 is a block diagram of an FM stereo radio receiver illustrating a second embodiment of the invention.

As a second embodiment of the invention, FIG. 9 shows an FM stereo radio receiver that differs from the first embodiment only in the internal configuration of the multipath noise reducer 50. Moreover, the multipath noise reducer 50 in the second embodiment differs from the multipath noise reducer 5 in the first embodiment only in regard to the high-pass filter. Specifically, whereas the high-pass filter 5a in the first embodiment preceded the absolute-value calculation unit 5b, the high-pass filter 5g in the second embodiment follows the absolute-value calculation unit 5b. Accordingly, the output of the FM demodulator 4 is supplied to the absolute-value calculation unit 5b, the output of the absolute-value calculation unit 5b is supplied to the high-pass filter 5g, and the output of the high-pass filter 5g is supplied to the comparator unit 5c and threshold generator 5d.

The high-pass filter 5a in the first embodiment detected both rising and falling edges of the demodulated signal. The high-pass filter 5g in the second embodiment, however, detects only one type of edge. In the following description it will be assumed that the high-pass filter 5g detects only rising edges.

Figure 10:
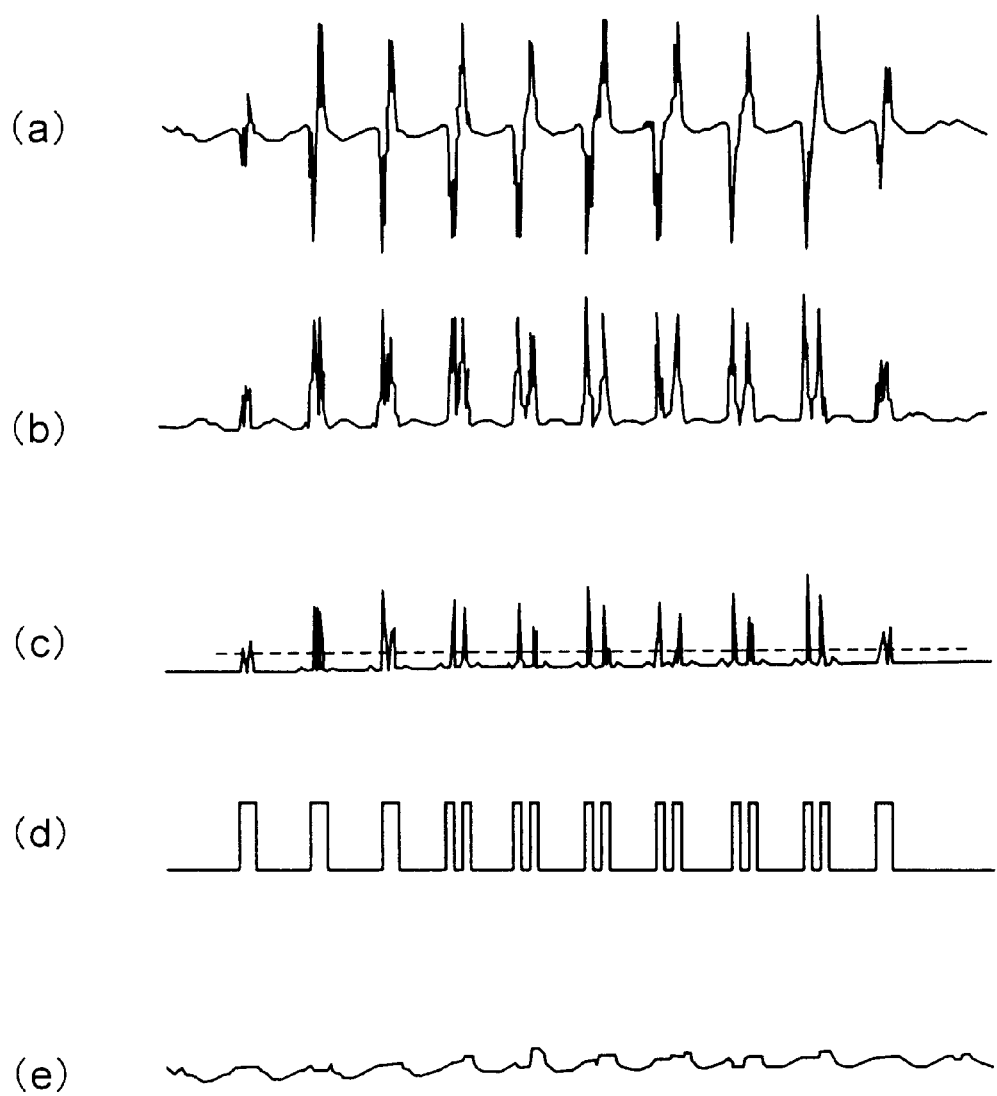
FIG. 10 is a waveform diagram illustrating the operation of the multipath noise reducer in FIG. 9.

FIG. 10 shows waveforms of the output of the FM demodulator 4 (a), the output of the absolute-value calculation unit 5b (b), the output of the high-pass filter 5g (c), the output of the comparator unit 5c (d), and the output of the storage unit 5f (e) during an interval of multipath noise in the second embodiment. The illustrated interval is the expanded interval shown at the bottom of FIG. 2.

Waveform (b) in FIG. 10 is substantially identical to waveform (a) with negative values replaced by positive values of like magnitude. From waveforms (b) and (c), it can be seen that the high-pass filter 5g generates one positive pulse, in waveform (c), for each rising edge in the absolute-value waveform (b). The comparator unit 5c compares the output by the high-pass filter 5g with the threshold signal (dotted line) supplied by the threshold generator 5d to generate the gate pulse waveform (d). The output of the storage unit 5f, shown in waveform (e), is held constant during the pulses in the gate pulse waveform (d).

A comparison of the gate pulse waveforms (d) in FIGS. 4 and 10 shows that the second embodiment generates somewhat narrower gate pulses than the first embodiment. There are also cases in which the second embodiment generates two separate gate pulses, one representing a negative noise spike and the other representing the following positive noise spike, where the first embodiment generates a single wider gate pulse covering both noise spikes. This is a consequence of the detection of only one type of edge (e.g., only rising edges) by the high-pass filter 5g in the second embodiment.

The gate pulses (d) in the first embodiment (FIG. 4) tend to be slightly wider than the actual multipath noise spikes, because the high-pass filter 5a detects both types of edges. The gate pulses (d) in the second embodiment (FIG. 10) represent the actual widths of the noise spikes more accurately. Thus in eliminating multipath noise, the second embodiment causes even less distortion of the audio output signal than does the first embodiment.

Another advantage of the second embodiment is that the high-pass filter 5g can have a simpler internal structure than the high-pass filter 5a in the first embodiment. The reason is that to detect multipath noise spikes accurately, the high-pass filter 5a in the first embodiment requires a sharp cut-off characteristic, while the high-pass filter 5g in the second embodiment does not require such a sharp cut-off characteristic. Thus the high-pass filter 5a in the second embodiment can be less expensive and more compact than the high-pass filter 5g in the first embodiment.

Figure 11:
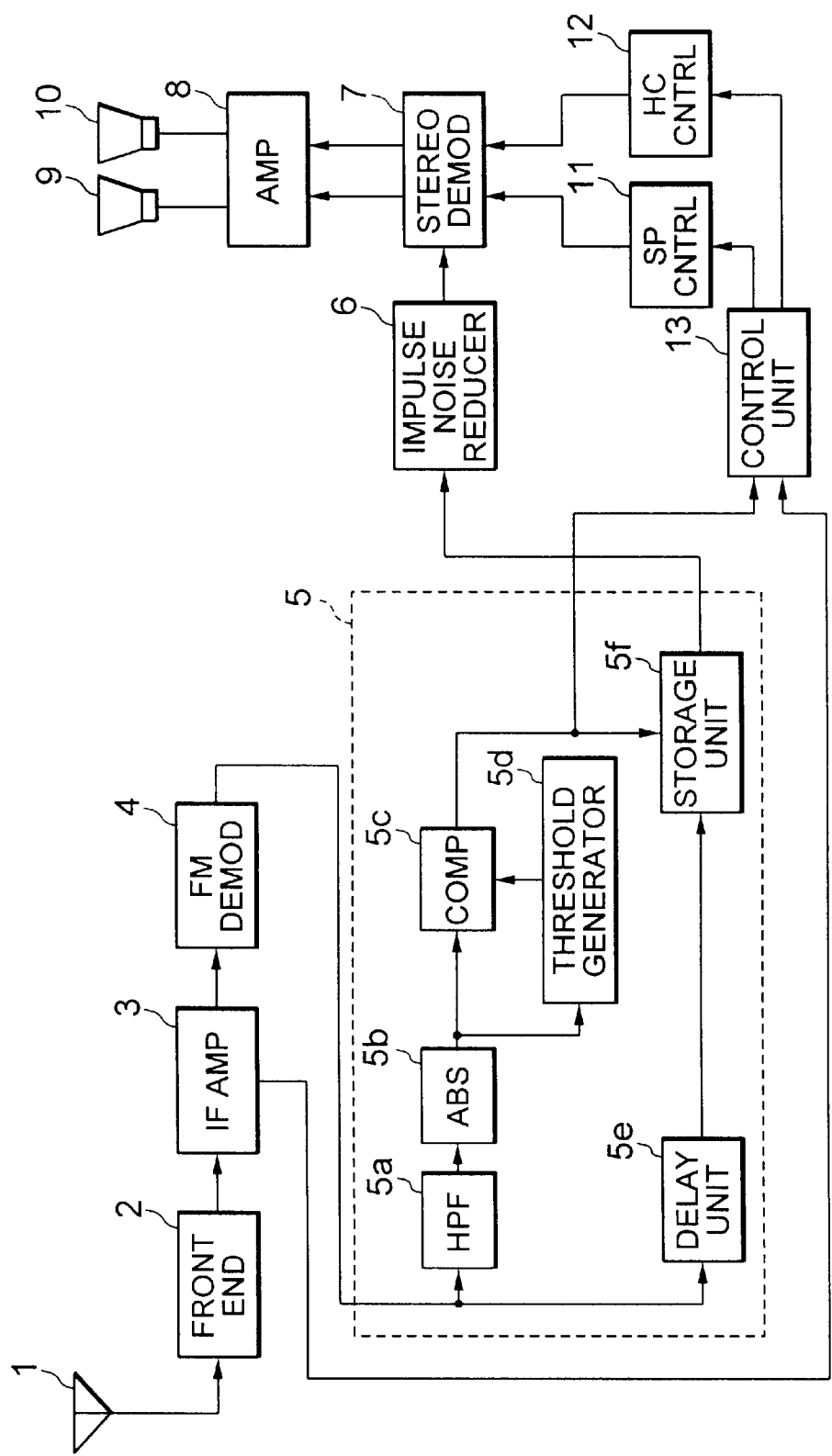
FIG. 11 is a block diagram of an FM stereo radio receiver illustrating a third embodiment of the invention.

As a third embodiment of the invention, FIG. 11 shows an FM stereo radio receiver in which a control unit 13 is added to the audio output circuit of the first embodiment. The control unit 13 receives the S-meter signal output by the IF amplifier 3 and the gate pulse signal output by the comparator unit 5c in the multipath noise reducer 5, and generates control signals for input to the stereo separation controller 11 and high-cut controller 12. The elements other than the control unit 13 operate in the same way as in the first embodiment, so detailed descriptions will be omitted.

Figure 12:
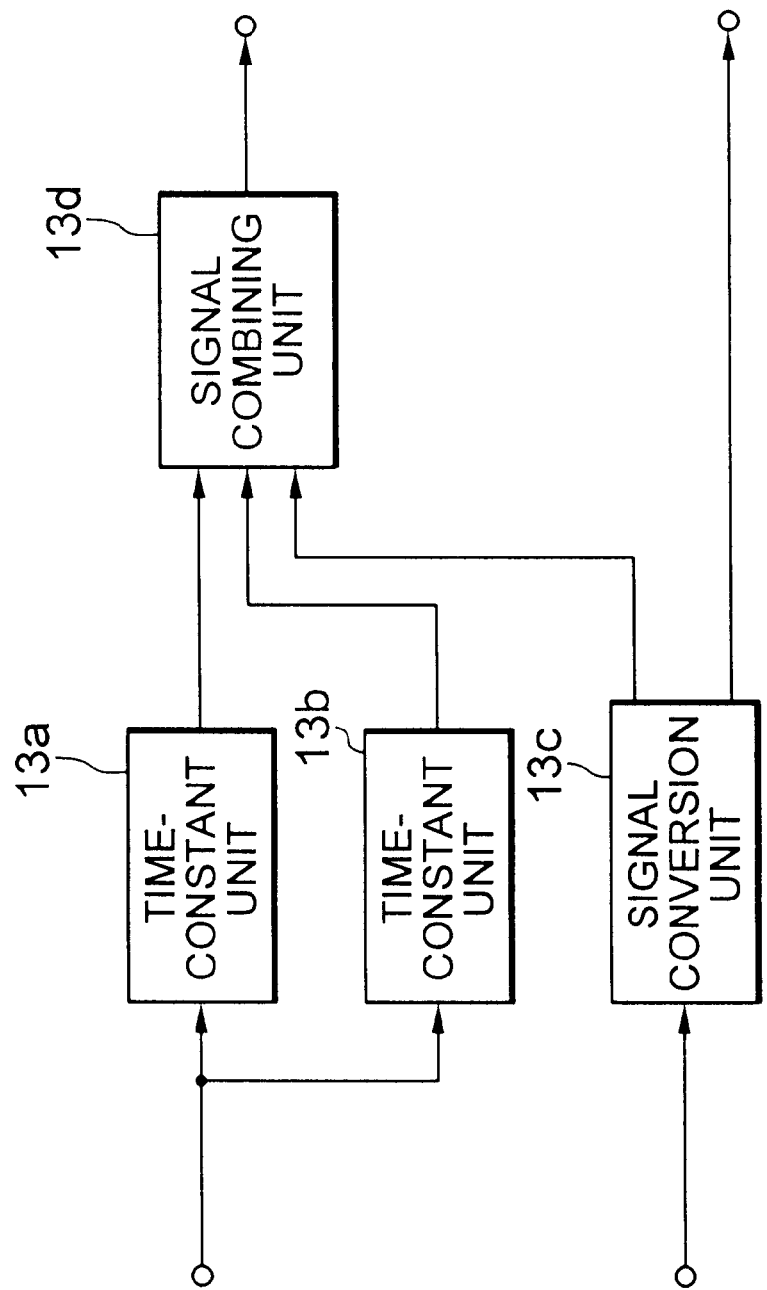
FIG. 12 is a block diagram illustrating one possible structure of the control unit in FIG. 11.

Referring to FIG. 12, the control unit 13 comprises a pair of time-constant units 13a, 13b, a signal conversion unit 13c, and a signal combining unit 13d.

The two time-constant units 13a, 13b process the detection signal received from the comparator unit 5c in the multipath noise reducer 5, using two different time constants, and supply the resulting signals to the signal combining unit 13d. The signals output by the time-constant units 13a, 13b reflect both present and past values of the comparator output signal, the time constants determining the extent to which past values are reflected. Low-pass filters can be used as the time-constant units 13a, 13b, but if digital signal processing is employed, various other types of time-constant computation are possible, using pulse width as a parameter, for example.

The signal conversion unit 13c converts the S-meter signal received from the IF amplifier 3 to a stereo separation control signal and a high-cut control signal. The stereo separation control signal, supplied to the signal combining unit 13d, indicates the degree of stereo separation that is desirable in relation to the electric field strength received at the antenna 1. The high-cut control signal, supplied to the high-cut controller 12, indicates the degree to which high frequencies should be attenuated in the demodulated signal.

The signal combining unit 13d combines the signals received from the time-constant units 13a, 13b and the signal conversion unit 13c to generate a single control signal, which is supplied to the stereo separation controller 11.

As described in the preceding embodiments, the impulse noise reducer 6 removes the individual noise spikes occurring during an interval of multipath noise, but does not correct distortion that occurs between the noise spikes. This inter-spike distortion is not completely negligible, as can be seen from the enlarged waveform (b) in FIG. 2. Since this distortion is not removed by the impulse noise reducer 6, it is helpful to lessen the distortion by reducing the degree of stereo separation.

Figure 13:
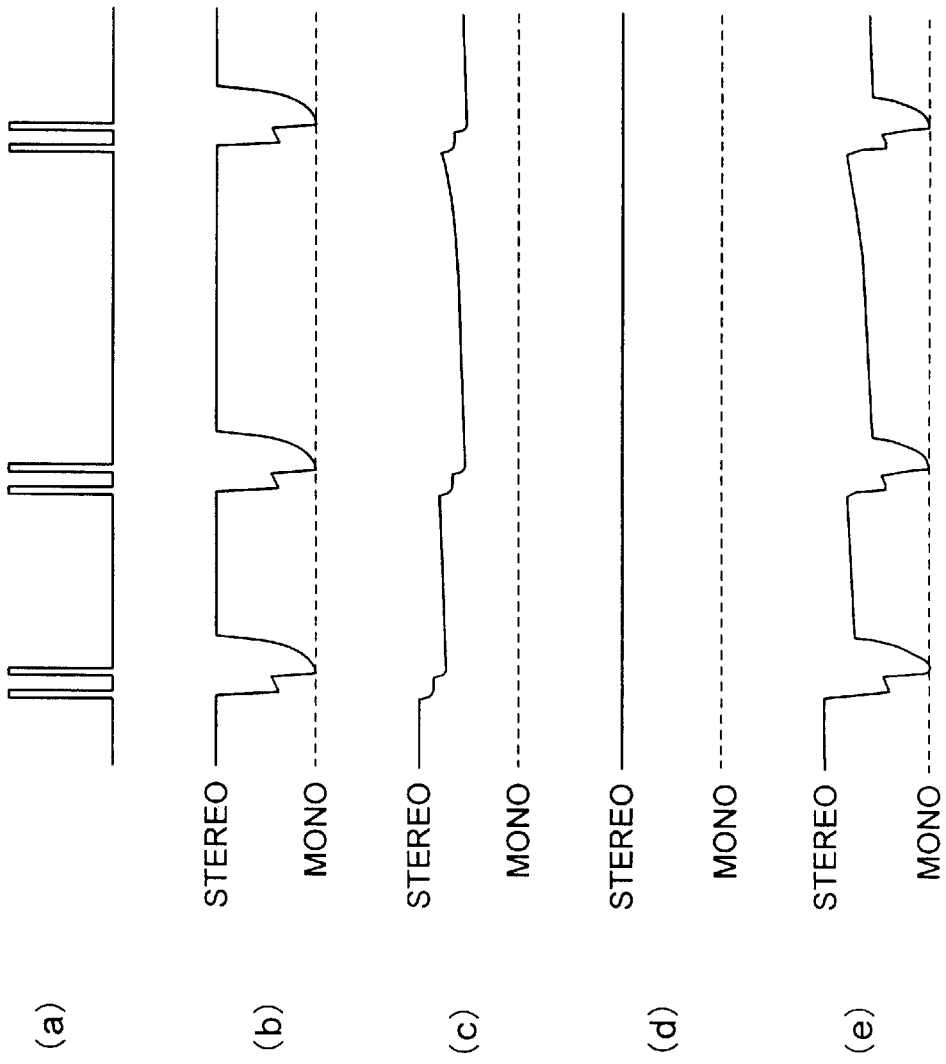
FIG. 13 is a waveform diagram illustrating the operation of the control unit in FIG. 12.

FIG. 13 illustrates the operation of the control unit 13. The first waveform (a) is the gate pulse signal output by the comparator unit 5c in the multipath noise reducer 5. The next waveform (b) is the signal output by time-constant unit 13a. This signal (b) is a stereo separation control signal that varies between a control value corresponding to full stereo separation, indicated by the word STEREO in the drawing, and a control value corresponding to no stereo separation, that is, to fully monaural operation, indicated by the word MONO in the drawing. This signal (b) drops quickly from the full-stereo level toward the monaural level during each gate pulse, then rises more slowly back toward the full-stereo level.

The next waveform (c) is the signal output by time-constant unit 13b. This signal is another stereo separation control signal that varies between values corresponding to full-stereo and full-monaural operation. This signal also drops toward the monaural level during gate pulses and rises back toward the full-stereo level after each gate pulse, but the drops and rises take place more slowly than in the preceding waveform (b), because time-constant unit 13b has a longer time constant than time-constant unit 13a.

The next waveform (d) is the stereo separation control signal output from the signal conversion unit 13c to the signal combining unit 13d. This waveform also varies between full-stereo and full-monaural levels. In FIG. 13, the received field strength is assumed to be sufficiently high for full stereo separation, so this signal remains constant at the full-stereo level.

The final waveform (e) is the waveform output by the signal combining unit 13d. This waveform is generated by, for example, multiplying the three preceding waveforms (b), (c), (d) together by analog multiplier means. Alternatively, if digital signal processing is employed, various arithmetic and logic operations can be used to combine waveforms (b), (c), and (d) to obtain waveform (e). For example, logical AND operations and logical OR operations can be performed on the sign bits indicating the signal polarities.

The reason for employing two time-constant units 13a, 13b with different time constants is the following. A short time constant, as illustrated in waveform (b), is appropriate for reducing the distortion caused by multipath noise itself, but the resulting rapid transitions between full stereo separation and fully monaural output cause other types of distortion, including such severe types as an unstable sound image and rapid fluctuations in volume. A long time constant, as illustrated in waveform (c), avoids these other types of distortion, but does not lead to effective reduction of the distortion resulting from multipath noise. Combining the control signals obtained with both time constants enables the distortion caused by multipath noise to be reduced effectively without introducing other types of severe distortion.

In a variation of the third embodiment, time-constant unit 13b is eliminated, and the signal combining unit 13d receives control signals only from time-constant unit 13a and the signal conversion unit 13c. Time-constant unit 13a, which still has a comparatively short time constant, is modified so that after making a transition from the full-stereo level to the monaural level in a series of steps, the control signal output by the time-constant unit 13a also recovers to the full-stereo level in a series of steps. This variation is illustrated in FIG. 14, in which the top waveform (a) is the gate pulse signal received from the comparator unit 5c, and the bottom waveform (b) is the stereo separation control signal output by the time-constant unit 13a.

The number of steps in the recovery from monaural to stereo operation does not necessarily have to be equal to the number of steps in the transition from stereo to monaural operation, as shown in FIG. 14. Any stepwise recovery scheme that prevents rapid fluctuations in the volume of the reproduced signal can be employed.

Figure 15:
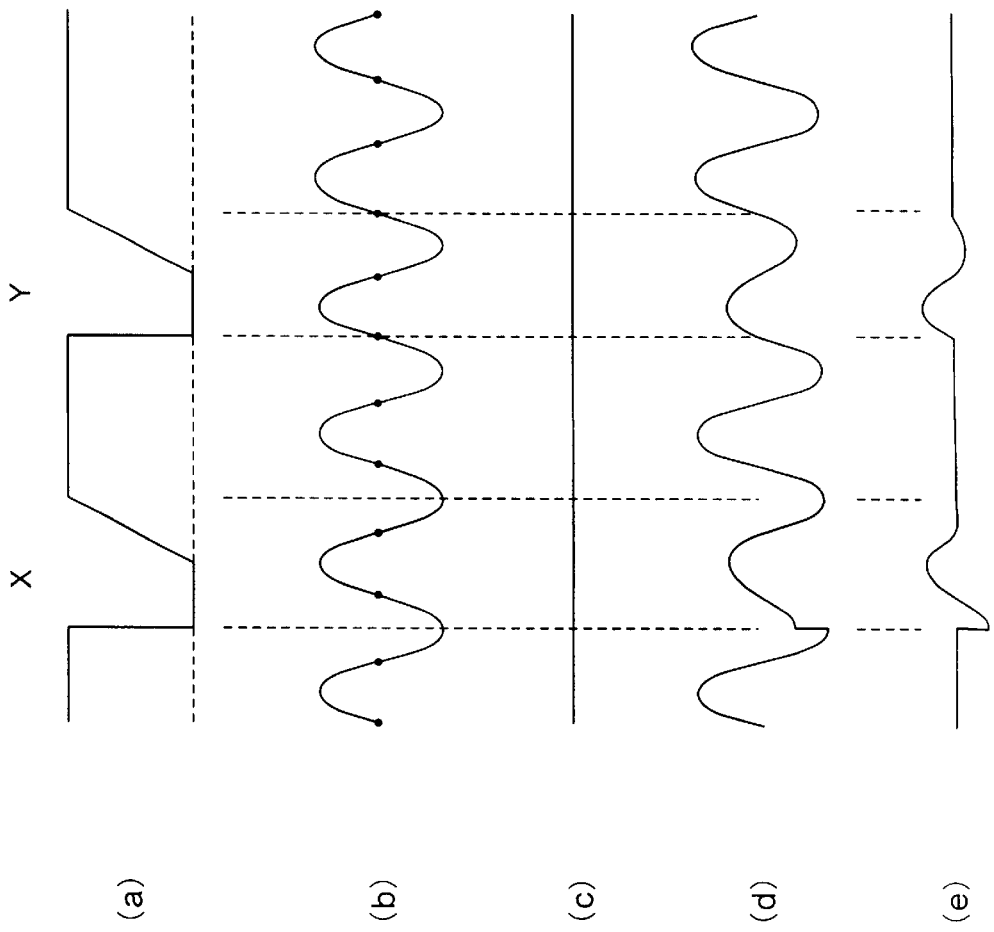
FIG. 15 is a waveform diagram illustrating the operation of another variation of the control unit in FIG. 12.

In another variation of the third embodiment, the control unit 13 is modified to begin stereo separation control at zero-crossing points of the demodulated stereo signal. This variation avoids discontinuities in the output audio waveforms. The principle is illustrated in FIG. 15, in which the top waveform (a) is a schematic representation of the control signal output by, for example, time-constant unit 13a. The next two waveforms (b) and (c) represent the left and right channels, respectively, of the audio output signal before stereo separation control. The black dots indicate the zero-crossing points of the left-channel waveform (b). The last two waveforms (d) and (e) represent the left and right channels, respectively, of the audio output signal after stereo separation control. FIG. 15 shows an extreme example in which the left channel is a sine-wave signal and the right channel is silent.

The first control interval X begins midway between two zero-crossing points in the audio signal, causing an abrupt transition from stereo to monaural output at this point. Since the monaural signal amplitude is half the sum of the left and right channel signals, i.e., (L+R)/2, the signal amplitude in the left channel is abruptly reduced by half, while the signal amplitude in the right channel is abruptly increased by a similar amount, as shown in waveforms (d) and (e). These sudden, discontinuous changes in the audio signal waveforms produce artifacts such as audible clicks in the audio output.

The second control interval Y begins at a zero-crossing point. Consequently, both the left- and right-channel signals change continuously, as shown in waveforms (d) and (e), and no audible artifacts are produced.

In order to avoid excessive delays in the onset of stereo separation control, the zero-crossing points used in this variation of the third embodiment are zero-crossing points in comparatively high frequency components of the audio signal, in the audio mid-range and treble range, detected by the control unit 13 after the bass component has been removed. Furthermore, stereo separation control does not have to begin exactly at a zero-crossing point; it suffices for stereo separation control to begin close to a zero-crossing point. For example, stereo separation control can begin when a zero crossing is detected by a change in the sign bit of a digital audio signal, or in the polarity of an analog audio signal.

Figure 16:
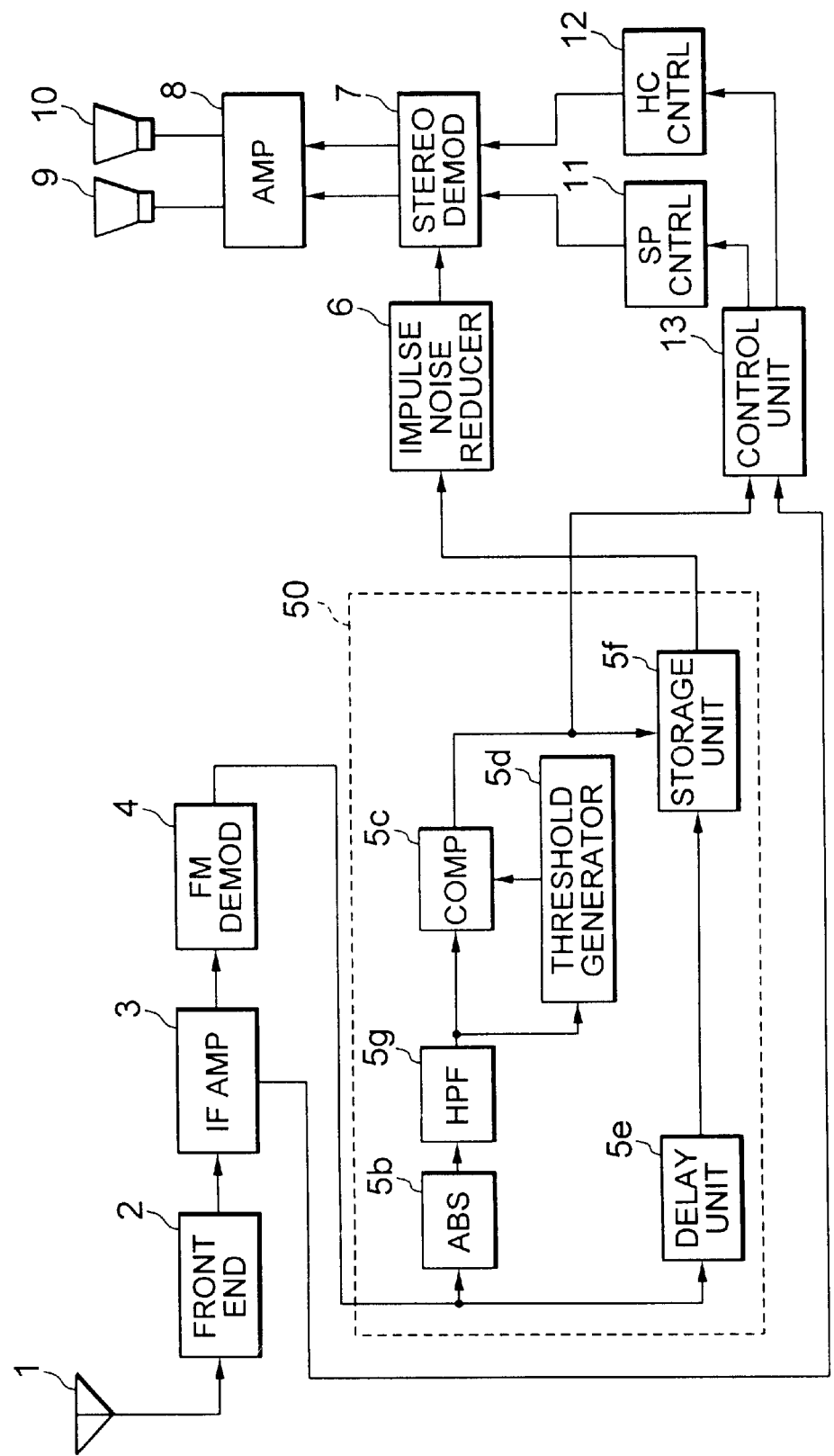
FIG. 16 is a block diagram of an FM stereo radio receiver illustrating a variation of the third embodiment.

In still another variation of the third embodiment, the control unit 13 is employed with the multipath noise reducer 50 of the second embodiment, as illustrated in FIG. 16. This variation is a straightforward combination of the second and third embodiments, so a detailed description will be omitted.

Those skilled in the art will recognize that further variations of the embodiments described above are possible within the scope claimed below.

What is claimed is:

1. A multipath noise reducer for reducing multipath noise present in an input signal, comprising:
   rectifying means for receiving the input signal and generating a rectified signal corresponding to an absolute value of the input signal;
   threshold-calculating means for receiving the rectified signal from the rectifying means and generating a threshold signal having a value related to the rectified signal;
   comparator means for receiving the rectified signal from the rectifying means and comparing the rectified signal with the threshold signal, thereby detecting said multipath noise in the input signal, and generating a detection signal indicating presence of said multipath noise in the input signal; and
   modification means for receiving the detection signal from the comparator means and modifying the input signal according to the detection signal, thereby reducing the multipath noise present in the input signal.

2. The multipath noise reducer of claim 1, wherein the rectifying means comprises:
   a high-pass filter; and
   absolute-value calculation means.

3. The multipath noise reducer of claim 2, wherein the absolute-value calculation means calculates an absolute value of the input signal, and the high-pass filter generates the rectified signal from said absolute value.

4. The multipath noise reducer of claim 1, wherein the threshold-calculating means includes smoothing means for smoothing said rectified signal.

5. The multipath noise reducer of claim 4, wherein the threshold-calculating means also includes amplitude limiting means for limiting at least one of an input and an output of the smoothing means, thereby limiting variations in the threshold signal.

6. An audio output circuit for generating an audio signal from an input signal, comprising:
   rectifying means for receiving the input signal and generating a rectified signal corresponding to an absolute value of the input signal;
   threshold-calculating means for receiving the rectified signal from the rectifying means and generating a threshold signal having a value related to the rectified signal;
   comparator means for receiving the rectified signal from the rectifying means and comparing the rectified signal with the threshold signal, thereby detecting said multipath noise in the input signal, and generating a detection signal indicating presence of said multipath noise in the input signal; and
   modification means for receiving the detection signal from the comparator means and modifying the input signal according to the detection signal, thereby reducing the multipath noise present in the input signal.

7. The audio output circuit of claim 6, wherein the audio signal is a stereo signal, further comprising control means for receiving the detection signal from the comparator means and generating a control signal controlling stereo separation of the audio signal according to the detection signal.

8. The audio output circuit of claim 7, wherein said control means comprises time-constant means for combining past and present values of the detection signal according to a predetermined time constant, the control signal being generated from an output of the time-constant means.

9. The audio output circuit of claim 8, wherein the control means causes the control signal to vary in a stepwise manner.

10. The audio output circuit of claim 8, wherein the control means causes control of the stereo separation of the audio signal to start at a zero-crossing point of a comparatively high-frequency component of the audio signal.

11. An FM radio receiver comprising:
    rectifying means for receiving the input signal and generating a rectified signal corresponding to an absolute value of the input signal;
    threshold-calculating means for receiving the rectified signal from the rectifying means and generating a threshold signal having a value related to the rectified signal;
    comparator means for receiving the rectified signal from the rectifying means and comparing the rectified signal with the threshold signal, thereby detecting said multipath noise in the input signal, and generating a detection signal indicating presence of said multipath noise in the input signal; and
    modification means for receiving the detection signal from the comparator means and modifying the input signal according to the detection signal, thereby reducing the multipath noise present in the input signal.

12. A method of reducing multipath noise within an input signal, comprising the steps of:
    receiving an input signal from a receiver and passing the input signal through a high pass filter and absolute value calculator, which rectify the input signal;

generating a threshold signal based on the rectified signal;

generating a detection signal by comparing, in a comparator, the rectified signal and the threshold signal, the detection signal indicating the multipath noise within the input signal; and modifying the input signal according to the detection signal generated in the comparator thereby reducing the multipath noise in the input signal.

13. A multipath noise reducer for reducing multipath noise within an input signal, comprising:

a rectifier which receives the input signal and generates a rectified signal corresponding to an absolute value of the input signal;

a threshold generator operatively connected to said rectifier, said threshold generator generating a threshold signal based on the received rectified signal from said rectifier;

a comparator operatively connected to said rectifier and said threshold generator, said comparator comparing the rectified signal with the threshold signal to create a detection signal indicating the presence of a multipath noise in the input signal; and an impulse noise reducer operatively connected to said comparator, said impulse noise reducer modifying the input signal according to the detection signal received from said comparator, thereby reducing the multipath noise present in the input signal.

* * * * *